June 11, 1929.  F. SMITH  1,716,468
SHOCK ABSORBING DEVICE FOR MOTOR ROAD VEHICLES
Filed Sept. 8, 1926  3 Sheets-Sheet 3
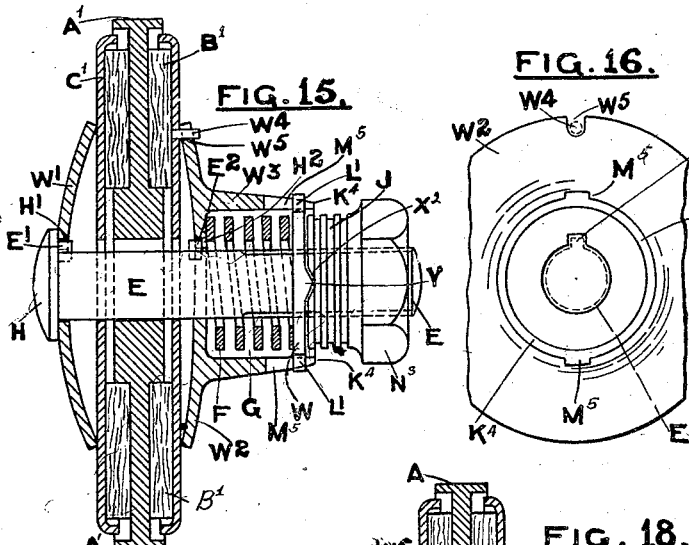
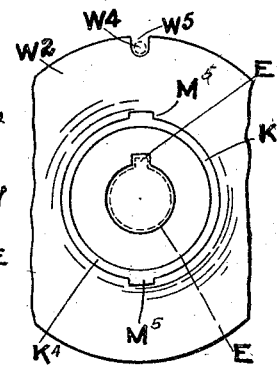
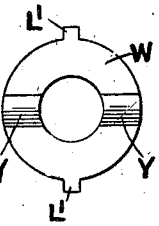
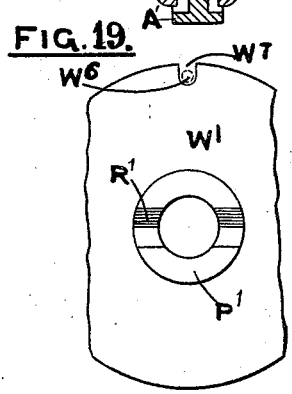
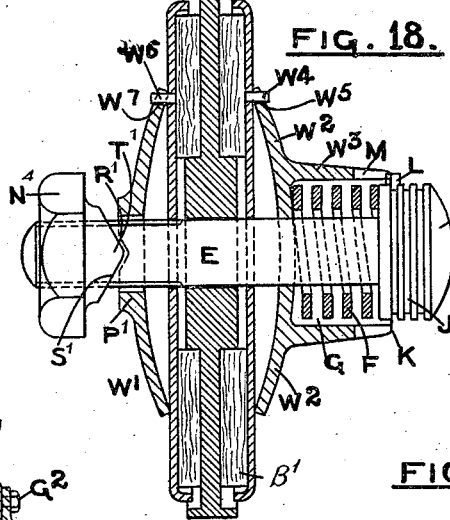
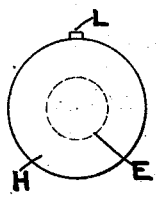
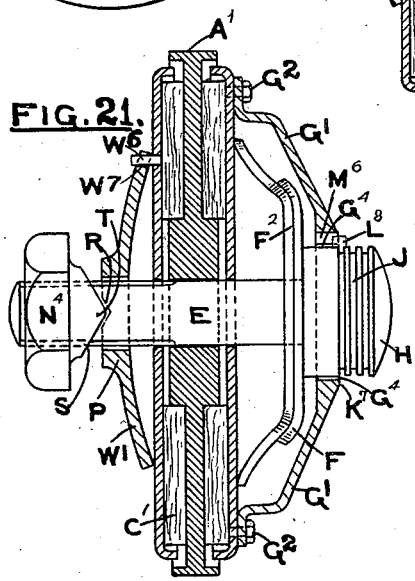
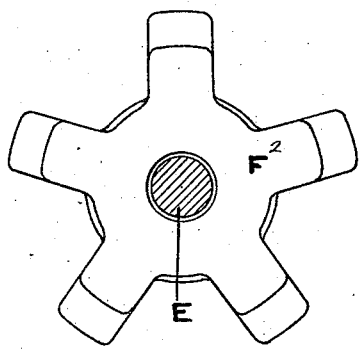

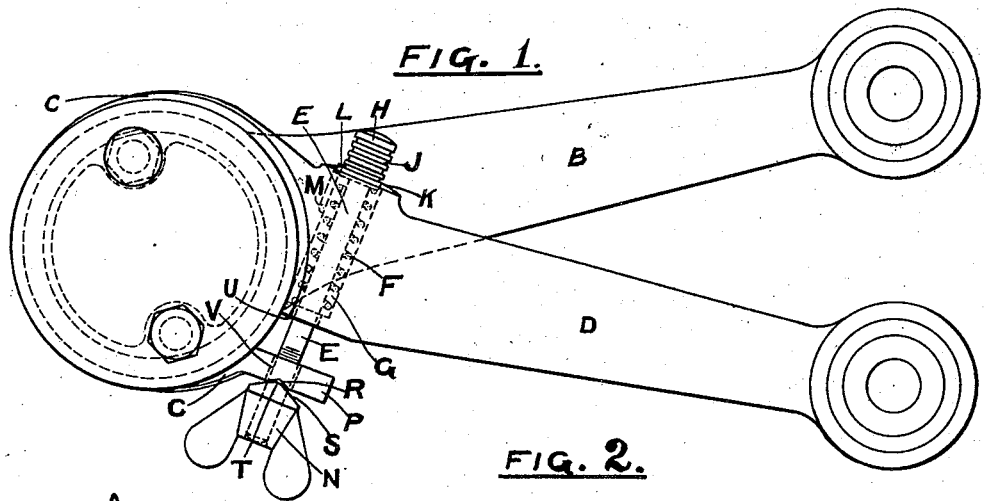
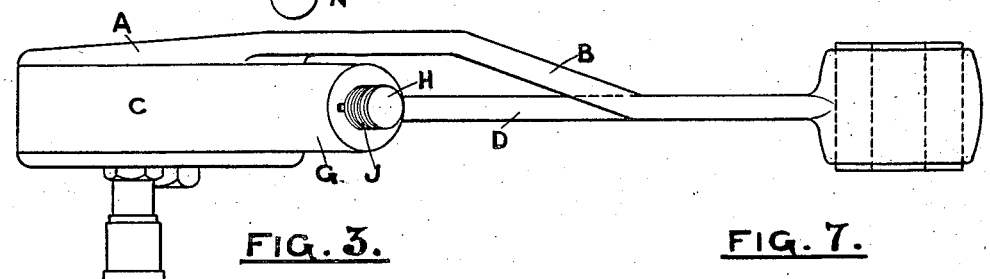
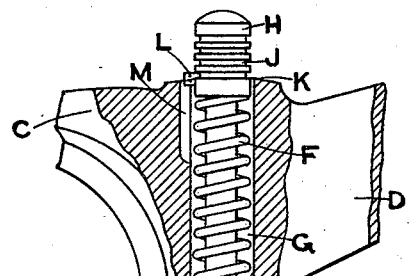
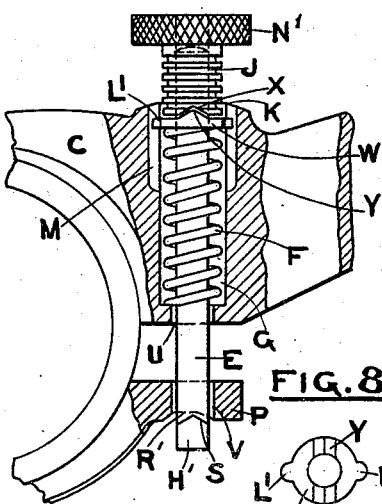
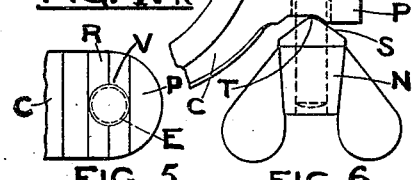
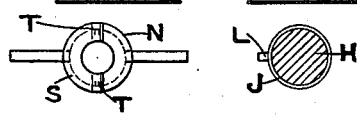

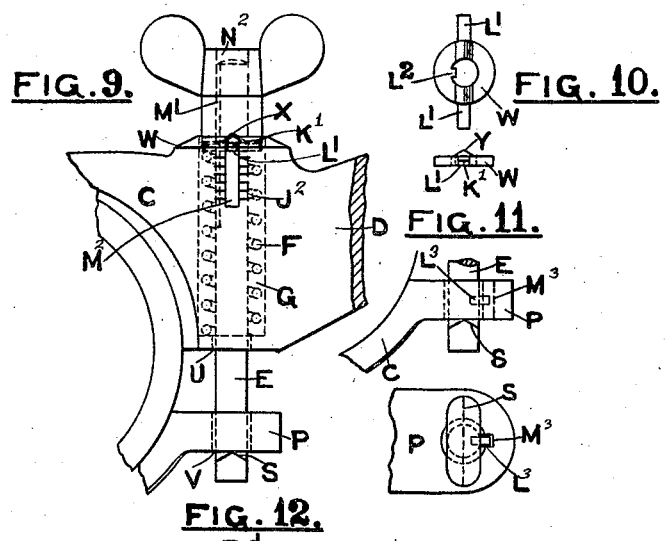

Patented June 11, 1929.

1,716,468

UNITED STATES PATENT OFFICE.

FRANK SMITH, OF ELLAND, ENGLAND.

SHOCK-ABSORBING DEVICE FOR MOTOR-ROAD VEHICLES.

Application filed September 8, 1926, Serial No. 134,195, and in Great Britain September 23, 1925.

This invention relates to means for putting an adjustable restraint upon a vehicle spring upon its expansion movement or upon its movement in both directions whereby a predetermined corresponding adjustment may be effected upon the rest of the corresponding vehicle springs and comparison made on reference thereto; and has for its object an improved construction and simplification of such means in order not only to effect a predetermined uniform adjustment of the restraint put upon all the vehicle springs, but also to indicate any change or variations of the said adjustment in any of the said springs which may occur by reason of wear in a corresponding brake lining or brake discs, or from any other cause, so that such variation may be corrected. Also to provide improved means for locking certain parts after adjustment.

This invention is equally applicable to what are known as coil friction shock-absorbing devices, wherein a brake band or lever more or less encircles a drum with a bolt carrying a tensioning spring and nut passing through the ends of said band and tending to press the said ends together, or, to a friction disc device, wherein friction discs and washers are held together in an elastic manner by a spring, washer, bolt and nut. In both instances indicating means are provided upon the head of the tensioning bolt, or upon a nut member, or upon a washer thereon, all of which in co-operating with a fixed indicator are given an axial movement relative to the indicator against the tension of the spring when tightening up the bolt, showing the amount of compression put upon said spring, or subsequently, any variation thereof.

Where the indicating means is upon the bolt head the latter is adapted to engage (in the coil friction type) the customary spring within a recess or housing in the brake band or lever, and said means preferably comprise a number of spaced grooves formed thereon, but a scale or any other suitable marks, or the like may be set out thereon, as desired. A conical, tapering or other element encircling the top of the said housing serves as a pointer or indicator in connection with the said indicating means. The opposite end of the said bolt has preferably a wing nut screwing thereon into engagement with the customary lug on the brake band, and a taper sided or V recess formed in the said lug is adapted to be engaged by corresponding or similar faces upon the nut.

The operation of the nut is effected preferably by half turns, the inclined meeting faces of both lug and nut and the rounded vertex of the latter enables the said nut to ride up the sides of the recess in the lug in the turning movement and on completing each half turn to re-engage the recess in the lug with a snap action due to the tension put upon the spring in the band or lever upon screwing up the nut. The diameter in the bore formed in the lug suitably exceeding the diameter of the bolt in connection with the shape of the meeting faces of both lug and nut, permits of a more efficient direct axial movement of the bolt and prevents any frictional engagement thereof with the sides of said bore, or with the spring, during the functioning of the braking device.

The length of the bolt, the spring, and the recess or housing therefor, and their relative arrangement, is such that when the tension put upon the spring is at zero the bottom or first groove or the like in the bolt head is preferably flush with the pointer or indicator, so that upon putting restraint upon the vehicle spring by screwing up a nut upon the opposite end of said bolt, the latter is moved axially causing the indicating means to more or less enter the spring housing compressing the spring therein to a corresponding extent which is reflected in the damping action or restraint put upon the expansion movement or upon both expansion and compression movements, as the case may be, of the vehicle spring, the amount of which may be ascertained on reference to the number of grooves or the like marks still visible upon the indicating means.

The nut screwing upon the bolt may be turned until the desired number of grooves or the like are visible beyond the pointer or indicator upon the housing, for example, preferably the end or last groove in said indicator, to put the desired restraint upon the vehicle spring. To bring the adjustment of the other springs into agreement, the indicating means of the corresponding devices are adjusted to correspond, in a similar manner.

Should any slackness or wear and tear take place in the frictional gripping faces of the shock-absorber, the tension of the spring in the recess or housing aforesaid immediately reacts or expands to a corresponding degree with the result the indicating means is moved outwardly, possibly exposing one or more additional grooves or the like upon the projecting portion thereof. This variation or difference may be easily and quickly corrected by again tightening up the bolt until the original adjustment is obtained.

The nut is locked following each adjustment, by the tension of the spring in the lever acting directly to hold the same within the recess in the lug whilst the bolt is prevented from turning by a snug on the bolt head adapted to engage a corresponding longitudinal groove in the side of the spring housing.

In a modification, the indicator is formed upon a nut element screwing upon the aforesaid bolt and more or less into the recess housing the spring, whilst the meeting faces of the bolt head now at the opposite end of said bolt and the aforesaid lug upon one end of the brake band, are formed in the manner before described with reference to the original device. A washer is placed upon the bolt between the end of the spring and the nut element or indicator, having conical projections thereon adapted to engage similar recesses in the said element. Restraint in this case is put upon the vehicle spring by screwing the nut element or indicator on the bolt more or less into the spring housing compressing the spring as desired, and the amount of such restraint is ascertained by reference to the number of grooves or the like indicating means exposed to view in the manner before described. The bolt is prevented from turning or is locked after each adjustment by the tension put upon the spring holding the meeting faces of the bolt head and lug in constant engagement in the manner previously described with reference to the wing nut. The nut element or indicating means is prevented from turning by similar meeting faces formed upon both the washer and the nut element, whilst the washer is prevented from turning by snugs on opposite sides thereof adapted to engage corresponding longitudinal grooves in the sides of the spring housing.

In a further modification, the indicating marks or the like may be formed or set out on the brake band or lever on one side of the spring housing. The opposing snugs forming part of a washer adapted to fit upon the bolt between the top of the spring and a nut element screwing thereon, are adapted to engage corresponding slots formed in each side of the said housing the ends being flush with the same. One of the said snugs serves as a pointer and has a mark thereon adapted to register with the indicating grooves or marks on the tightening up of the nut element. A further snug or key in the bore of the said washer engages a corresponding groove or key-way in the bolt to prevent the latter from turning during the screwing or unscrewing of the nut element thereon, the lug on the brake band and the bolt head being of normal construction. The washer also possesses the aforesaid conical projections, adapted on engagement with corresponding recesses in the nut element, to lock the latter after each adjustment of the restraint put upon the vehicle spring, otherwise the operation of the parts for putting on the said restraint and indicating the amount of variation thereof are such as before described. In place of the snug in the bore of the washer and its engagement with a key-way on the bolt for preventing the turning of the latter, I may accomplish the same object by forming or securing a snug upon the bolt adapted to engage with a key-way in the bore of the lug on the brake band.

A still further modification may embody a washer placed upon the bolt between the bolt head and the top of the spring, having vertical opposing flanges or wings adapted to slide up or down the aforesaid slots formed in the sides of the spring housing preferably flush with the exterior thereof. The grooves, marks or the like is or are set out upon one of these wings and the tapering or bevelled element encircling the top of the spring housing serves as a pointer in connection therewith for indicating the amount of restraint put upon the vehicle spring or any variation thereof, as aforesaid. A flat sided bolt head fits between these vertical wings, and its engagement therewith or close proximity thereto of opposite sides, prevents the said bolt from turning during the adjustment of the aforesaid restraint, preferably by a wing nut screwed on to the opposite end thereof. The meeting faces of both the lug on the brake band and the said nut are substantially of the same construction as described with reference to the original device, except that the recess in the lug has a truncated vertex, and operates to lock the said nut after each adjustment, as before described.

In the application of my invention to the friction disc type of shock-absorber, the indicating means is also similarly formed upon the head of the bolt holding the discs and washers together, or upon a nut member screwing thereon, or, upon a washer, in the manner before described. A flange or sleeve may be formed upon one of the washers to provide a housing for a coiled spring adapted to hold the friction members together, with opposing slots in the outer rim thereof, and snugs formed upon or secured to certain parts, are provided for preventing the turning of other parts when compressing the said spring by a nut member in the manner before described.

As a modification, the coiled spring and its housing may be dispensed with and the bolt head or nut member may be adapted to engage the customary spring washer or spider spring; the length of the bolt head or the like, and its arrangement relatively to the pointer or indicator surrounding the bore of a dished cover or the like and enclosing said spring, is such, that, the bolt head or nut member upon tightening up the bolt, is adapted to more or less enter the bore in the cover according to the amount of tension put upon the spring in which operation the grooves or the like exposed to view thereon become less in number indicating by comparison with the number contained upon said head or member, the amount of tension put upon said spring. Any lessening of the said tension from any cause is reflected in the increased extension of the head, and by comparing the marks now exposed to view thereon with the original adjustment, the amount of variation therein is readily ascertained and corrected, in the manner before described with reference to the coil friction shock-absorbing device.

It will be obvious that the grooves, marks or the like aforesaid, may be dispensed with and the distance between the pointer or the top of the spring housing and the end of the indicating element, ascertained by a suitable measuring instrument, but this method is not as convenient as when using grooves or marks upon said element, in the manner before described.

I attain these objects by the means illustrated in the accompanying drawings, in which:—

Fig. 1 is a side elevation of a coil friction shock-absorbing device for motor road vehicles, with my invention applied.

Fig. 2 is a plan view of Fig. 1.

Fig. 3 is a sectional elevation of my invention as applied to Fig. 1, showing a modification of the recess in the lug on the brake band.

Figs. 4 and 5 are plan views of the meeting faces of the lug on the brake band and the nut element illustrated at Fig. 1.

Fig. 6 is a sectional plan of indicator or bolt head shown in Fig. 1, showing the snug thereon adapted to engage a corresponding groove in the spring housing for preventing the bolt from turning.

Fig. 7 is a sectional elevation of a modification of my invention shown at Figs. 1, 2, 3, 4, 5 and 6.

Fig. 8 is a plan view of the washer shown at Fig. 7 adapted to lock the nut element or indicator screwing on to the bolt after each adjustment.

Fig. 9 is a further modification of the means shown at Figs. 1 to 6 for locking the parts putting a restraint upon the vehicle spring, after each adjustment thereof.

Fig. 10 is a plan and elevation respectively of the washer shown at Fig. 9, serving as a pointer, for locking the nut element, and for preventing the bolt from turning.

Fig. 11 is an elevation and plan of a modification of the means shown at Fig. 9 for preventing the turning of the bolt.

Fig. 12 is a modification of Fig. 9.

Fig. 13 is a plan and elevation respectively of the washer carrying indicating means and means for locking the bolt, shown at Fig. 12.

Fig. 14 is an elevation of a part of a shock-absorbing device with my invention applied showing improved means for enabling a direct axial movement of the bolt during the functioning of the said device when the faces upon the ends of the brake band get out of parallel owing to wear.

Fig. 15 is a sectional elevation of a disc type of shock-absorber showing the invention illustrated at Fig. 7, applied thereto.

Fig. 16 is an end view of one of the washers engaging a friction member of this type of shock-absorber, constructed to also form a housing for the spring elastically holding them together.

Fig. 17 is a similar view to Fig. 8, of a loose washer adapted to lock the nut member in Fig. 15, after each adjustment.

Fig. 18 is a similar view to Fig. 15, showing the invention illustrated at Figs. 1–3 applied thereto.

Fig. 19 is a similar view to Fig. 16, of the washer adapted to similarly engage a friction member on the opposite side of the shock-absorber, and means formed thereon for preventing the turning of a nut member screwing upon the tension bolt.

Fig. 20 is an end view of the tensioning bolt head containing indicating means thereon, showing means adapted to prevent the said bolt from turning during the screwing of a nut member thereon.

Fig. 21 is a similar view to Figs. 15 and 18, showing the bolt head or the like adapted to engage a single or laminated spider spring washer, and an outer cover secured to one of the friction members of the shock-absorber also adapted to serve as a pointer or indicator for the indicating means carried by the bolt head or a nut member.

Fig. 22 is an end view of the laminated spring washer employed in Fig. 21.

Similar letters refer to similar parts throughout the several views.

With reference to Figs. 1 to 6 of the drawings, A is a drum, B is a lever integral therewith, C is a brake band and D a lever integral therewith, all being part of a shock-absorbing device of normal construction, the levers being adapted to be secured to oppositely moving parts of a vehicle.

E is a tensioning bolt, F is a spring, G is a recess in the lever D, adapted to house the spring F and bolt E. H is an indicating head, J are spaced grooves or the like indicating means formed upon the head H, and K is a pointer acting in connection with the grooves J. L is a snug on the head H adapted to engage a groove M in the spring housing G.

N is a nut screwing upon the bolt E into engagement with the lug P on the band C, R is a conical or V recess in the lug P adapted to be engaged by a similarly shaped meeting face or abutment S upon the nut N, and T is the rounded vertex to facilitate the disengagement of the nut with the recess R. U is a bore in the band or lever and V is a bore in the lug P sufficiently larger in diameter than the bolt so as not to interfere with the direct axial movement of the latter during the functioning of the shock-absorbing device.

With reference to the modification shown at Figs. 7 and 8, the indicating means is set out upon a nut member N′ adapted to screw on to the bolt E with a washer W upon the said bolt between the nut member and the spring F. X are conical recesses in the bottom of the member N′, Y are corresponding projections upon W adapted to engage the recesses X, whilst $L^1$ are opposing snugs adapted to engage corresponding longitudinal grooves M in the spring housing G. The bolt head H′ engages the lug P, and the meeting face of bolt head and lug are shaped in accordance with the lug and nut of the original device, or the recess R′ in the lug may have a flat vertex, if desired.

In a further modification (see Figs. 9, 10 and 11) the grooves, marks or the like indicating means $J^2$ are formed upon the band C or lever D. A washer W is also placed upon the bolt E between the nut member $N^2$ and the spring F, and slots $M^2$ are formed in opposite sides of the housing G adapted to be engaged by the snugs $L^1$ upon the washer. A mark, groove or the like upon one of the said snugs may serve as a pointer or indicator K′ in connection with the indicating grooves or marks upon the said spring housing, the lug and bolt head engaging therewith being of normal construction as shown, or in accordance with the other similar means before described, as desired. $L^2$ is a snug upon the washer adapted to engage a corresponding longitudinal groove $M^1$ in the bolt E to prevent the latter from turning. Instead of using snug $L^2$ a snug $L^3$ may be upon bolt E and engage a corresponding groove $M^3$ in the lug P, in the manner clearly shown at Fig. 11.

With reference to Figs. 12 and 13, the modification therein consists mainly in the form of washer $W^9$ employed. In this instance it is provided with wings or flanges Z, the grooves, marks or the like J are set out upon the front of one of these wings and the taper or bevelled member K encircling the top of the housing G as in Fig. 1, operates in connection therewith. The bolt head H fits between the said wings in the washer which prevent the bolt from turning, and the slots $M^2$ in housing G engaging the wings Z prevent the washer from turning, whilst the plain surface $R^1$ at the bottom of the conical recess in the lug P permits more freedom to the latter, or to the bolt, in the direct axial movement of the bolt during the functioning of the shock-absorbing device; how this is effected is shown more clearly at Fig. 14.

With reference to Figs. 15 to 17, the tensioning bolt E, spring F and nut member $N^3$ operate to yieldingly press together the friction members of this class of shock-absorber, just as the corresponding means shown at Figs. 7 and 9 tend to press the ends of the brake band together. The disc form of absorber conventionally illustrated in these figures includes a disc A′, which is connected to one member of a vehicle frame, and washers or discs B′, C′, mounted in a suitable casing and connected to another member of the vehicle frame. In this instance however, two dished washers $W^1$, $W^2$, are preferably employed upon the tensioning bolt adapted to engage opposite sides of the friction device. One of these washers $W^2$ has a flange or projecting sleeve $W^3$ formed thereon, adapted to form a housing for the tensioning spring F and the end of the flange serves as a pointer or indicator $K^4$ operating in conjunction with the indicating means J upon the nut member screwing upon the said bolt, and opposing slots or grooves $M^3$ and $X^2$ therein and in the nut member respectively, are adapted to be engaged by corresponding projections $L^1$ and Y upon the washer W as clearly shown at Figs. 8 and 17, in the manner before described with reference to Fig. 7 of the drawings.

Upon screwing the nut $N^3$ upon the bolt E to compress the tensioning spring F putting a varying pressure upon the washers $W^1$, $W^2$, co-operating with the friction member aforesaid, the recess X therein rides up the corresponding projections Y on the washer W. Upon the nut completing a half turn, the said projections re-engage the recess again locking the nut member $N^3$, and they continue to remain in engagement when the desired adjustment in the restraint put upon the vehicle spring has been completed; the washer itself being prevented from turning by the snugs $L^1$ thereon as they move more or less longitudinally of the recesses or grooves $M^5$ in the spring housing in washer $W^2$, the latter is in turn prevented from turning by a recess $W^5$ therein engaging a snug $W^4$ on one of the friction members, and snugs E¹, E², upon the bolt in engaging further recesses H¹, H², in the washers W¹, W², similarly prevent the said bolt from turning.

Referring to Figs. 18 to 20, the indicating means J and nut member N⁴ screwing upon the tensioning bolt are arranged in the manner shown with reference to Figs. 1 to 3, the nut member also having a conical face S' with rounded vertex T' adapted to engage a conical recesss R' formed in a boss P' of the dished washer W' each half turn as and for the purposes aforesaid, the snug L on the bolt head H being adapted to engage the groove or slot M in the spring housing G to prevent the bolt from turning, whilst snugs W⁴, W⁶, upon opposite sides of the friction device are adapted to engage corresponding recesses W⁵, W⁷, in the dished washers to prevent them turning during the operation of the nut member N⁴.

With reference to Figs. 21 and 22, the dished washer W² housing the spring is dispensed with and a laminated spider spring F² is employed adapted to directly engage the friction device. A dished cover G¹ is also preferably employed enclosing the said spring, secured by bolts G² to a member of the friction device. The bore G⁴ of the cover adapted to surround the bolt head H is approximately of the same diameter and has a groove M⁶ therein. This cover is made to serve as a pointer or indicator K⁷ in conjunction with the indicating means J during the compression of the spring by H or N⁴ on tightening up bolt E, whilst a snug L⁸ upon the head adapted to engage groove M⁶ therein, prevents the bolt E from turning. A snug W⁶ upon a friction member is adapted to engage the recess W⁷ in the dished washer W¹ to prevent the latter from turning during the screwing up of the nut member.

What I claim as my invention, and desire to secure by Letters Patent, is:

1. In a vehicle shock absorber, the combination with two members adapted to be respectively connected with oppositely moving parts of a vehicle, and friction means interposed between said members and including a spring within a housing on one of said members, of a tensioning bolt for varying the operative force of the spring on the friction means, and means carried by said bolt and adapted by movement into and from the spring housing to indicate the desired, predetermined, amount of restraint to movement exerted by the spring and any subsequent variation in said restraint.

2. In a vehicle shock absorber, the combination with two members adapted to be respectively connected with oppositely moving parts of a vehicle, and friction means interposed between said members and including a spring within a housing on one of said members, of a tensioning bolt extending through the spring, and means carried by the tensioning bolt, comprising a plurality of indicators, extending concentric with the axis of the bolt and spaced longitudinally of that axis, adapted to show the amount of restraint provided by the spring at any time and any subsequent variation in said restraint.

3. In a vehicle shock absorber, the combination with two members adapted to be respectively connected with oppositely moving parts of a vehicle, and friction means interposed between said members and including a spring within a housing on one of said members, a bolt extending through the spring, a nut engaged with the bolt, the bolt and nut being relatively movable in the direction of the length of the bolt to vary the force of the spring on the friction means, and means on one of said elements adapted by movement into and from the spring housing to indicate the amount of restraint provided by the spring at any time and any subsequent variation in said restraint.

4. In a vehicle shock absorber, the combination with two members adapted to be respectively connected with oppositely moving parts of a vehicle, and friction means interposed between said members and including a coiled spring, means for varying the force exerted on the friction means by the spring including bolt extending axially through the spring, and means for indicating the relative amount of force exerted by the spring and any variation thereof comprising graduations spaced longitudinally of the axis of the bolt and extending concentric with such axis.

5. In a vehicle shock absorber, the combination with two members adapted to be respectively connected with oppositely moving parts of a vehicle, and friction means interposed between said members and including a coiled spring, a housing for said spring on one of the members, a bolt extending axially through the spring and having a projection engaging a groove in the housing, to prevent the bolt from turning, and a graduated section projecting from one end of the spring housing, a nut rotatable on the bolt and having a wedge-shaped abutment on one face, and an abutment on the other member having a recess shaped similarly to and adapted to receive said abutment on the nut, whereby the nut will be locked at each half rotation on the bolt and the tension on the spring, or any variation from a predetermined tension, will be indicated by the extent of the projection of the graduated section of the bolt from the spring housing.

In testimony whereof I have signed my name to this specification.

FRANK SMITH.